United States Patent [19]

Morin

[11] 4,240,510
[45] Dec. 23, 1980

[54] COMBINED SCARIFIER AND BRANCH SLASHING AND CRUSHING IMPLEMENT

[76] Inventor: Armand Morin, 158-3rd Avenue, Chibougamau, Quebec G8P 1Z9, Canada

[21] Appl. No.: 1,221

[22] Filed: Jan. 5, 1979

[51] Int. Cl.³ .................................................. A01B 29/06
[52] U.S. Cl. ..................... 172/547; 172/39; 172/554
[58] Field of Search ............... 172/540, 547, 554, 34, 172/241, 177, 180, 39, 606; 404/121

[56] References Cited

U.S. PATENT DOCUMENTS

| | | | |
|---|---|---|---|
| 910,149 | 1/1909 | Powell | 172/177 |
| 922,572 | 5/1909 | Gates | 172/547 |
| 2,288,110 | 6/1942 | Schmeiser | 172/177 |
| 2,509,463 | 5/1950 | Wade | 172/554 |
| 2,870,850 | 1/1959 | Dethlefsen | 172/554 |
| 2,954,084 | 9/1960 | Swertfeger | 172/547 X |
| 3,084,747 | 4/1963 | Ferris | 172/554 X |

*Primary Examiner*—Richard J. Johnson

[57] ABSTRACT

A combined scarifier and branch slashing and crushing implement is disclosed. The implement comprises a rectangular frame, a cylindrical roller rotatably mounted in the frame and extending longitudinally of the frame, plural rows of longitudinally spaced scarifier teeth projecting from the roller for working the soil, and stationary teeth mounted on both the front and back longitudinal portions of the frame and projecting between the scarifier teeth. Each scarifier tooth has a hook member projecting laterally from the tooth in the direction of movement of the implement to engage branches, roots and other plant growths for slashing, crushing and cutting them against the stationary teeth which have cutting edges facing the hook members so as to provide a pulverized mixture which is thereafter mixed with the soil.

6 Claims, 4 Drawing Figures

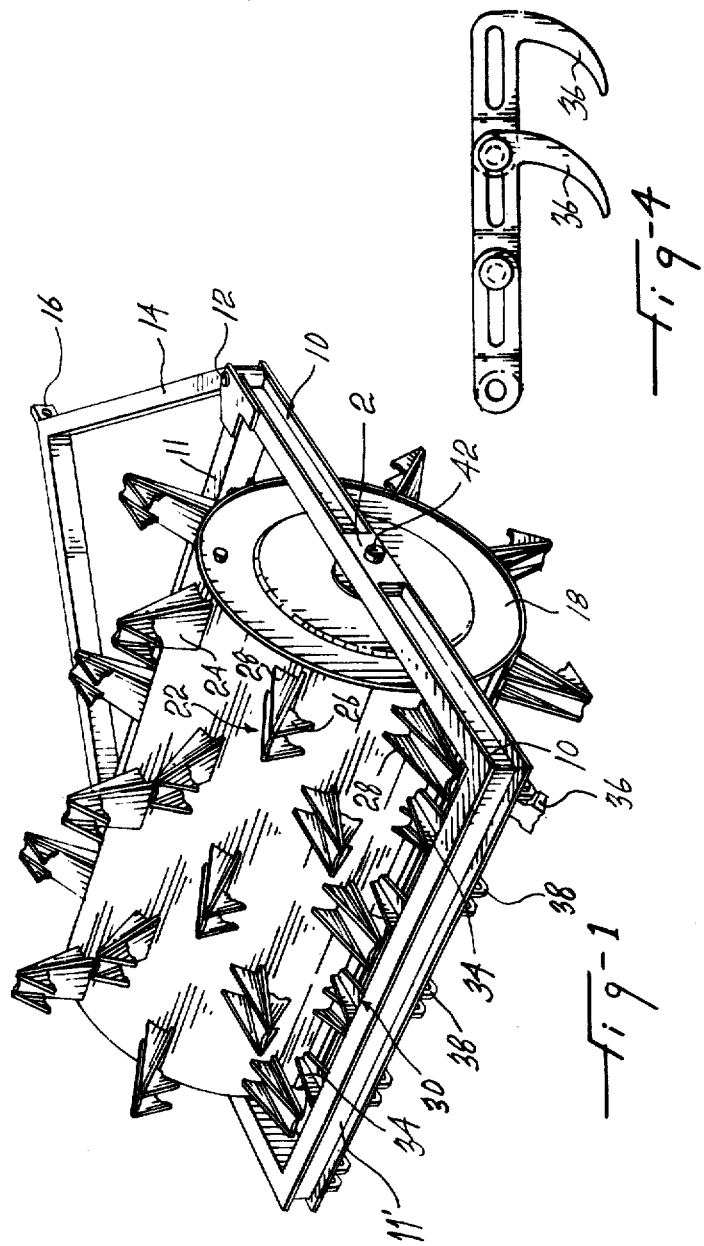

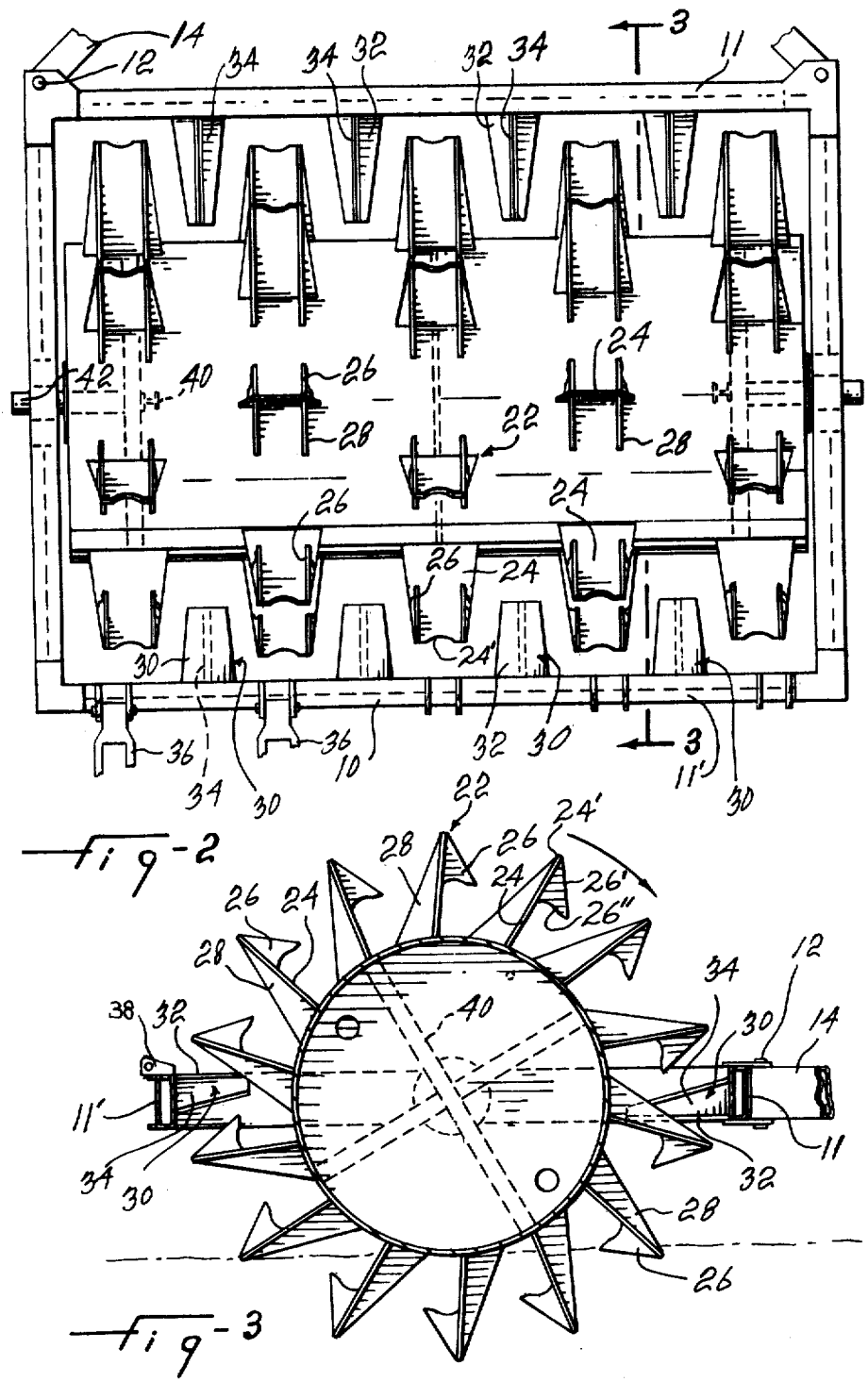

COMBINED SCARIFIER AND BRANCH SLASHING AND CRUSHING IMPLEMENT

This invention relates to a ground working implement and, more particularly, to a combined scarifier and branch slashing and crushing apparatus for use in the preparation of forest soil for seeding.

When working the forest soil after the trees have been cut, it is common practice to pulverize branches, roots and undesirable plant growth, loosen and work the soil, and mix the soil with the pulverized branches, roots and other plant growths. Some of the known implements are well suited for the pulverization of the branches, roots are plant growths but do not provide satisfactory working of the ground, while others are satisfactory for working the soil but do not provide adequate pulverization of the branches, roots and plant growths. Therefore, in the past, several types of implements have been used for effecting an adequate preparation of the soil before seeding.

It is the object of the present invention to provide an implement which can pulverize branches, roots and undesirable plant growths, adequately work the soil and thoroughly mix the pulverized branches, roots and plant growths with the soil.

The combined scarifier and branch slashing and crushing implement, in accordance with the invention, comprises a frame, a cylindrical roller rotatably mounted on the frame, a plurality of rows of longitudinally spaced scarifier teeth projecting from the roller for the working the soil, and stationary teeth mounted on the frame and projecting between the scarifier teeth. Each scarifier tooth has a finger-like element projecting laterally from the tooth in a plane perpendicular to the rotational axis of the roller to engage branches, roots and plant growths for slashing and crushing them against the stationary teeth so as to pulverize them and thoroughly mix them with the soil.

The frame is pivotable by about 180° around the longitudinal axis of the roller so that the implement may be towed in one direction or in the other direction as a slashing and crushing apparatus when moved in one direction and as a scarifier when moved in the other direction. When the implement is used as a scarifier, harrow teeth are attached to the frame to more thoroughly work the surface of the soil.

The invention will now be disclosed, by way of example, with reference to the accompanying drawings in which:

FIG. 1 illustrates a perspective view of an implement in accordance with the invention when used as a scarifier apparatus;

FIG. 2 illustrates a top view of the apparatus of FIG. 1 when used as a slashing and crushing apparatus;

FIG. 3 illustrates a section view taken along lines 3—3 of FIG. 2; and

FIG. 4 illustrates an elevation view of the harrow teeth used with the implement as shown in FIG. 1.

Referring to the drawings, there is shown in FIGS. 2 and 3 the implement in the position for carrying out slashing and crushing of the branches, roots and plants growths to pulverize them and thoroughly mix them with the soil. In FIG. 1, the implement is shown in the position for scarifying the soil and make it ready for tree seeding. The implement comprises a rectangular frame 10 to which is removably attached by means of a pin 12 a pair of converging draft members 14 adapted to be connected at 16 to the conventional drawbar of a tractor. A cylindrical roller 18 of a size suitable to contain up to 3,000 gallons of water is rotatably mounted on brackets 20 secured to frame 12. Both the front portion 11 and the back portion 11' of frame 10 extend parallel to the rotational axis of roller 18. Several rows of scarifier teeth 22 extend from the surface of the roller with the teeth in one row placed opposite the intervals between the teeth in the adjacent row. Each tooth is about 8 to 12 inches long and consists generally of a plate 24 extending longitudinally of the roller and provided with a pair of spaced parallel triangular plate 26 extending from the outer portion of one of the main faces of the plate 24 in a plane perpendicular to the rotational axis of the roller 18. Triangular plates 26 each define a first free edge 26' merging with the outer edge 24' of plate 24 and radially inwardly inclined relative to plate 24. Each plate 26 has a second free edge 26" facing roller 18 and substantially perpendicular to plate 24. Each edge 26" is preferably slightly curved inwardly. Each plate 26 forms a hook member. Each plate 24 is braced by two brackets 28, welded to the plate and to the surface of the roller. Brackets 28 extend in planes perpendicular to the axis of rotation of roller 18 and away from the other main face of plate 24 of each tooth is radially inclined by an angle of about 5 to 15° in the direction of movement of the implement when used as a slashing and crushing apparatus to give more strength to the teeth. The plates 24 are generally trapezoidal in shape with the side welded to the cylinder being wider than the other. Such other side of the plate 24 forms its outer edge 24' and is shown as being slightly curved inwardly but it may be linear, curved outwardly or slightly pointed. Stationary teeth 30 are mounted on the both the front portion 11 and the back portion 11' of frame 10 and extend toward roller 18 and between the scarifier teeth. As shown more clearly in FIGS. 2 and 3, each stationary tooth is made of a flat plate 32 braced by a bracket 34 perpendicular to plate 32 and having its free edge facing the hook member 26 of the scarifier teeth sharpened. Thus, bracket 34 forms a cutting member and is disposed in a plane perpendicular to the axis of rotation of roller 18. The teeth located on the front portion 11 of the frame are slightly longer than the ones located on the back portion 11' of the frame. The plates 32 of the stationary teeth are also trapezoidal in shape with the side welded to the frame being wider than the one facing the roller and are disposed in a plane which is parallel to the longitudinal axis of the roller 18.

FIGS. 3 and 4 illustrate the implement in the slashing and crushing position wherein the frame is rotated by 180° from the position illustrated in FIG. 1. Branches lying on the soil and tree stumps and roots are trapped by hook member 26 of teeth 22 and crushed and cut against cutting brackets 34. In the scarification position of FIG. 1, the soil is thoroughly worked and holes are left by teeth 22 in preparation for seeding. In that position, the cutting brackets 34 of stationary teeth are not used. However, narrow teeth 36, shown in FIG. 4, are attached to the frame by means of brackets 38 for more thoroughly working the surface of the soil.

FIGS. 3 and 4 also show in dashed lines an X frame structure 40 welded inside the cylinder for supporting the inner end of a shaft 42 about which the roller is rotated.

In practice, to prepare the forest soil for aerial seeding, the implement is first moved over the ground in its position shown in FIGS. 2 and 3 for slashing and crushing the branches, roots and plant growths. Then, the implement is towed over the same soil surface while in the reverse position of FIG. 1: the teeth 22 dig up and turn the soil over and leave spaced apart deep holes in the soil. Those seeds which fall from an airplane into these holes will germinate.

Although the invention has been disclosed with reference to a preferred embodiment, it is to be understood that it is not limited to such embodiment but by the scope of the claims only. For example, the structure of the scarifier teeth could be different from the shape illustrated in the drawings provided that they are provided with finger-like elements extending laterally thereof for performing adequate slashing and crushing of the branches, roots and other plant growths to pulverize them and adequately mix them with the soil.

What I claim is:

1. A combined scarifier and branch slashing and crushing implement comprising:
   (a) a rectangular frame having end portions and straight front and back longitudinal portions;
   (b) a cylindrical roller rotatably mounted on said end portions and extending within said frame with its axis of rotation substantially parallel to said longitudinal portions;
   (c) plural rows of longitudinally spaced scarifier teeth secured to and projecting from said roller for working the soil; and
   (d) stationary teeth mounted on both said front and said back longitudinal portions of said frame and projecting between said scarifier teeth, each scarifier tooth including a main plate disposed parallel to the rotational axis of said roller and a triangular plate secured to the outer end portion of said main plate and projecting from one side of said main plate in a plane substantially perpendicular to the rotational axis of the roller, said triangular plate having a first edge merging with the radially outer edge of said main plate and radially inwardly inclined relative to said main plate, and a second free edge facing said roller and substantially perpendicular to said main plate, said triangular plate forming a hook member, each of said stationary teeth including a plate portion disposed in a plane perpendicular to the rotational axis of said roller and having a free cutting edge facing said hook member, said scarifier teeth adapted to first engage the branches, roots and plant growths and then to slash and cut the same against said stationary teeth to provide a pulverized mixture which thereafter is mixed thoroughly with the soil.

2. A combined scarifier and branch slashing and crushing implement as defined in claim 1, wherein each scarifier tooth is provided with a pair of said hook members, which are spaced from each other longitudinally of the roller.

3. A combined scarifier and branch slashing and crushing implement as claimed in claim 1, wherein the scarifier teeth are disposed in rows longitudinally of the roller and the scarifying teeth of any given row are staggered relative to the scarifying teeth of an adjacent row.

4. A combined scarifier and branch slashing and crushing implement as defined in claim 1, 2 or 3, wherein said main plate is radially inclined at an angle of between 5° and 15° in the direction of said hook members.

5. A combined scarifier and branch slashing and crushing implement as claimed in claim 1, 2 or 3, further including a reinforcing bracket plate of triangular shape for each scarifier tooth, said reinforcement bracket plate being secured to the roller surface and to the face of said main plate opposite the face carrying said hook member.

6. A combined scarifier and branch slashing and crushing implement as defined in claim 1, 2 or 3, wherein the main plate of each scarifier tooth is of trapezoidal shape with the larger base secured to the surface of the roller and with the smaller base forming the outer edge of said scarifier tooth, and wherein each stationary tooth includes a trapezoidal shape plate having its larger base secured to the respective longitudinal portions of said frame and a smaller base forming the free edge of said stationary tooth, said last-named plate secured to the cutting plate along the edge of the latter opposite said cutting edge.

* * * * *